April 27, 1948.　　　G. B. MONTGOMERY　　　2,440,344
LENS COUPLING MOUNT
Filed March 17, 1947
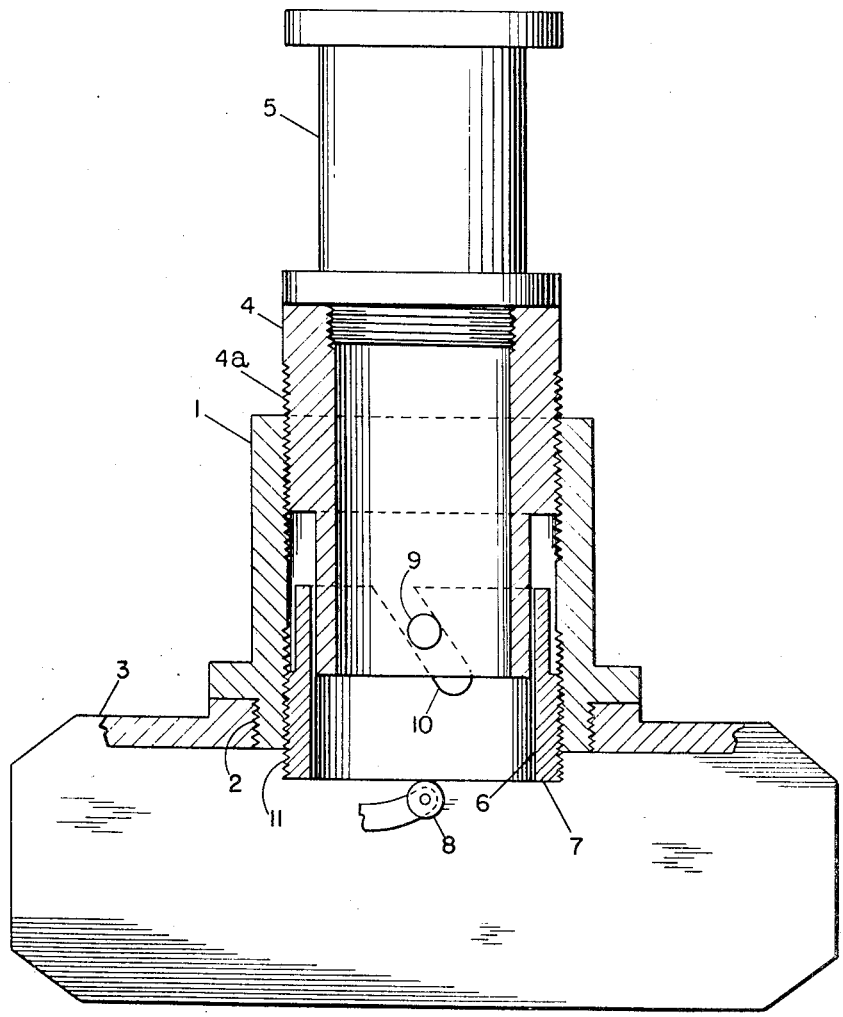
INVENTOR
GEORGE BERTRAM MONTGOMERY
BY
Pennie, Edmonds, Morton & Barrows
ATTORNEYS Patented Apr. 27, 1948

2,440,344

UNITED STATES PATENT OFFICE 2,440,344

LENS COUPLING MOUNT

George Bertram Montgomery, Castle-Douglas, Scotland

Application March 17, 1947, Serial No. 735,216
In Great Britain March 15, 1946

1 Claim. (Cl. 88—57)

This invention relates to lens coupling mounts and has for its object to compensate for small focal length variations unavoidable in the manufacture of lenses of the same nominal focal length.

In a lens coupling mount of the type including a main body of annular form adapted to engage a socket on the camera body and carrying two coaxial tubes adapted for relative axial movement, one of said tubes being a lens tube and supporting an objective, the other tube being a range-finder tube, the end of which latter tube is adapted to engage the normal range-finder gear of the camera, it is customary for the lens and range-finder tubes to be so coupled that a movement of the lens tube corresponding to a particular alteration in focus, and thus in range, causes a movement of the range-finder tube sufficient to move the range-finder gear an amount corresponding to the theoretical focal length of the objective, without allowance being made for the slight variation in focal length as between lenses of the same nominal focal length unavoidable in lens manufacture as a result of the tolerance which must be allowed in grinding lenses of the same nominal focal length.

According to the invention, in a lens coupling mount of the type referred to, one of the tubes is formed with a helical slot in the wall of the tube, and a pin is arranged to project from the wall of the other tube, said pin being adapted to engage said helical slot, the pitch of the helix being such as to provide, on movement of the lens tube, in addition to the altered axial relationship of the tubes required for focusing, a supplementary relative axial movement of the tubes of an amount to compensate for the amount by which the actual focal length of the associated objective differs from the theoretical focal length of the objective.

A practical embodiment of the invention is illustrated in the accompanying drawing which shows one form of lens coupling mount in section.

In the drawing 1 denotes the annular body screw-threaded at 2 to fit the camera body 3; 4 denotes the lens tube formed with a screw-thread 4a engageable with a corresponding screw-thread in the body 1, said lens tube 4 carrying an objective 5. 6 denotes the range-finder tube, the end 7 of which comes against a roller 8 operatively connected to the range-finder gear on the camera. 9 denotes the pin projecting radially from the wall of the lens tube 4, said pin 9 being in engagement with the helical slot 10 formed in the wall of the range-finder tube 6. The range-finder tube 6 is formed with a screw-thread 11 engageable with a mating screw-thread in the main body 1.

In practice, the pitches of the screw-threads 4a and 11 are so co-related that an axial movement of the lens tube 4 corresponding to a particular alteration in focus and thus in range, by differential action, will cause an axial movement of the range-finder tube 6 sufficient to move the range-finder roller 8 and thereby the range-finder gear a corresponding amount. Normally, in calculating the pitches of the screw-threads 4a and 11 the assumption is made that the objective to be used with the mount is of the correct theoretical focal length and the lens tube 4 and the range-finder tube 6 remain in phase during rotation. The pitch of the helical slot 10 in each mount is calculated according to the amount by which the focal length of the objective differs from the theoretical figure. The effect of the helical slot is to allow alteration of phase of the lens tube 4 and the range-finder tube 6 during the focusing operation by an amount sufficient to cause one tube to approach or recede from the other and thereby to compensate for the amount by which the focal length of the associated objective differs from the theoretical focal length.

What is claimed is:

A lens coupling mount comprising a main annular body to engage a socket on a camera body, two coaxial tubes carried by said annular body, said tubes being adapted for relative axial movement, one of said tubes being a lens tube including an objective fitting, and the other tube being a range-finder tube, range-finder gear on the camera body, the end of said range-finder tube adapted to engage said range-finder gear, the wall of one of said tubes being formed with a helical slot, and a pin projecting from the wall of the other tube and engaging said helical slot, the pitch of the helix being such as to provide, on movement of the lens tube, in addition to the altered axial relationship of the tube required for focusing, a supplementary relative axial movement of the tubes of an amount to compensate for the amount by which the actual focal length of the objective differs from the theoretical focal length of the objective.

GEORGE BERTRAM MONTGOMERY.

REFERENCES CITED

The following references are of record in the file of this patent:

UNITED STATES PATENTS

| Number | Name | Date |
|---|---|---|
| 1,935,430 | Barnack | Nov. 14, 1933 |
| 2,093,282 | Leitz et al. | Sept. 14, 1937 |
| 2,096,815 | Leitz | Oct. 26, 1937 |
| 2,117,231 | Trautmann | May 10, 1938 |
| 2,124,161 | Cook et al. | July 19, 1938 |
| 2,267,811 | Brownscombe | Dec. 30, 1941 |